United States Patent [19]
Trimmer

[11] Patent Number: 5,462,020
[45] Date of Patent: Oct. 31, 1995

[54] ANIMAL TAIL COVER

[76] Inventor: Charleen R. Trimmer, P.O. Box 100, Jacksonville, Oreg. 97530

[21] Appl. No.: 234,850

[22] Filed: Apr. 28, 1994

[51] Int. Cl.⁶ .................................................. A01K 13/00
[52] U.S. Cl. ................................ 119/850; 54/78
[58] Field of Search ................................ 119/850, 809, 119/810, 811; 54/78, 79.2; 132/274, 275, 273; 2/174

[56]  References Cited
U.S. PATENT DOCUMENTS

| | | | |
|---|---|---|---|
| D. 31,285 | 7/1899 | McClellan | 54/78 |
| 127,918 | 6/1872 | Parson et al. | 54/78 |
| 209,737 | 11/1878 | Weide | 54/78 |
| 212,836 | 3/1879 | Briggle | 54/78 |
| 2,487,005 | 11/1949 | Walker . | |
| 3,302,371 | 2/1967 | Beach . | |
| 3,347,018 | 10/1967 | Laidig . | |
| 3,534,527 | 10/1970 | Miller . | |
| 4,141,197 | 2/1979 | Nichols . | |
| 4,378,667 | 4/1983 | Velarde, Jr. | 54/78 |
| 4,850,181 | 7/1989 | Pirotta . | |
| 4,972,660 | 11/1990 | Black . | |
| 5,025,613 | 6/1991 | Connors . | |
| 5,062,256 | 11/1991 | Kingett et al. . | |
| 5,086,612 | 2/1992 | Anderson | 54/78 |
| 5,271,211 | 12/1993 | Newman . | |
| 5,293,884 | 3/1994 | Chapman et al. | 132/273 |

Primary Examiner—Todd E. Manahan
Attorney, Agent, or Firm—Kolisch, Hartwell, Dickinson, McCormack & Heuser

[57] ABSTRACT

A removable cover for the tail of an animal has a fabric enclosure that is fastened to the tail by a fastener that grips the tail below the dock of the tail. In an alternative embodiment, a tail cover is disclosed that grips the base of the tail by encompassing the tail in elastic fabric. In addition, a tail cover is disclosed that includes a support that extends upwardly from the fastener to help keep the upper portion of the enclosure on the upper portion of the tail to be covered. A method for covering a tail is also disclosed, including enclosing the tail in a fabric enclosure, holding the enclosure to the tail by a fastener that grips the tail below the dock of the tail, and supporting at least a portion of the enclosure above the fastener by inserting a flexible support into the enclosure between the fastener and the top of the enclosure.

21 Claims, 5 Drawing Sheets

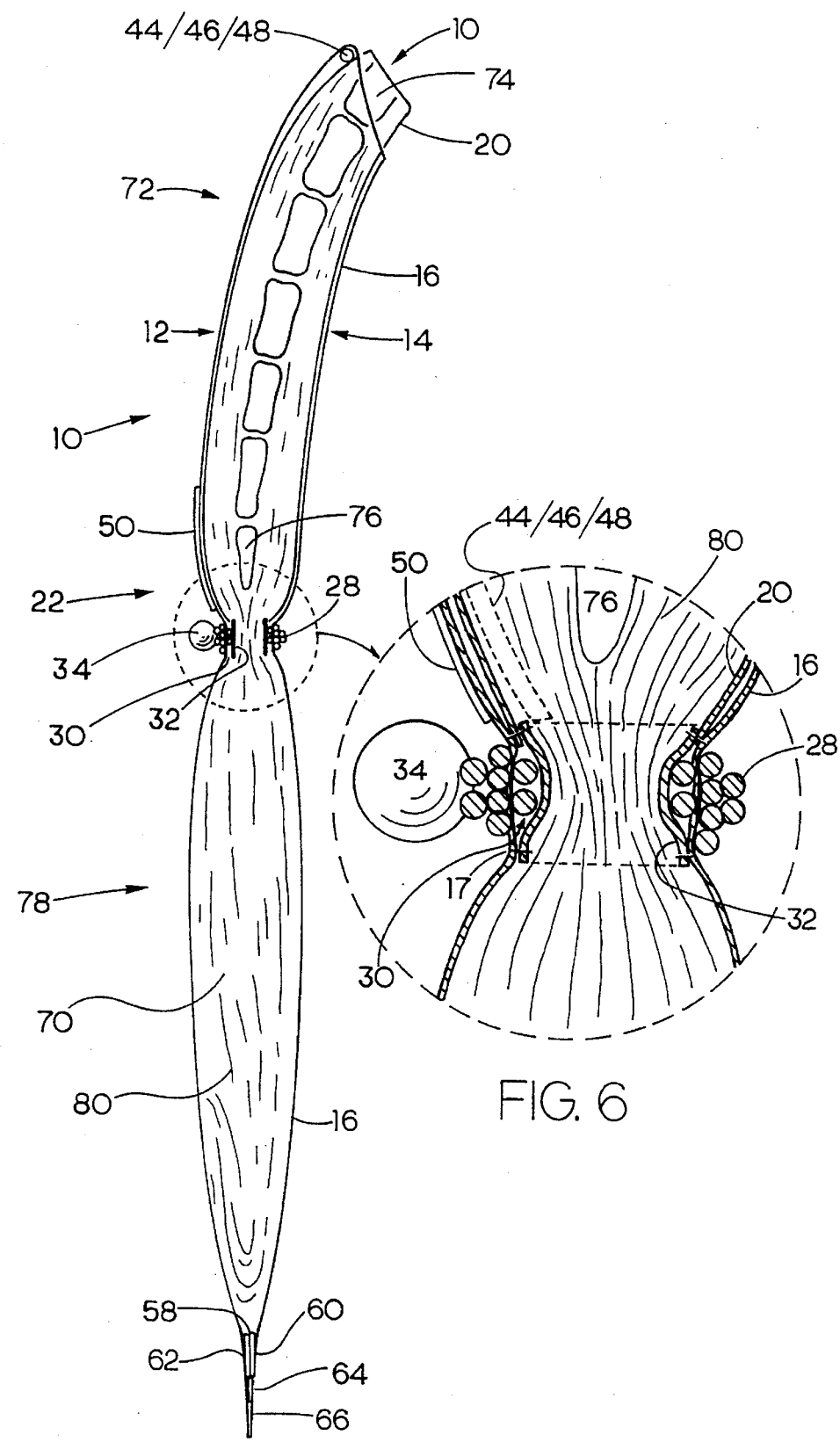

ANIMAL TAIL COVER

FIELD OF THE INVENTION

This invention relates generally to a device for covering and protecting the tail of an animal, and more particularly to a method of attaching such a cover to the tail.

BACKGROUND ART

Traditional tail covers are made in the form of a bag or other enclosure, and are attached to the animal by fastening a strap that extends over the back of the animal, and usually wraps around the neck of the animal. Such a tail cover is shown in the patent to Kingett et al., U.S. Pat. No. 5,062,256. Thus, traditional tail covers are difficult to install, and can irritate the animal on which they are installed.

SUMMARY OF THE INVENTION

The present invention is a cover for use on the tail of an animal, the cover being attachable to the tail without the need for attaching devices to any part of the animal other than the tail. The cover is attached to the tail by gripping the hair of the tail. In a first embodiment, the base or dock of the tail is gripped by being encompassed in an elastic fabric. In a second embodiment, the tail is gripped below the dock so that there is no constriction around the part of the tail that contains flesh and blood, and the tail cover is supported above the lower end of the dock by a support structure that is formed in the tail cover. In the preferred third embodiment, the tail cover of the present invention is attached to the tail by using a combination of the first and second embodiments, described above. Thus, the tail cover is partially held to the base of the tail by elastic material that encompasses the base of the tail, with further support being provided by a fastener that grips the tail below the .dock, and includes a support structure that extends upwardly from the fastener to support the upper portion of the tail cover.

Another aspect of the present invention involves a method of protecting and covering the tail of an animal, including enclosing the tail in a fabric enclosure, attaching the enclosure directly to the tail, reinforcing the tail cover with a semi-flexible structure, and providing a fringe at the end of the tail cover to simulate the swatting action of the tail.

The preferred embodiment of the cover of the present invention is a protective enclosure for the tail of an animal that is simple to use, allowing for its quick and easy installation and removal from the animal. It firmly grips the tail to ensure that it does not slip off the tail, but does not have any portions that grip the tail so tightly that it will rip out the hair of the tail if the cover becomes stuck on an obstacle like a fence. It does not require braiding of the tail or other preparation of the tail to be attached to the tail, but does protect a braided tail from unravelling or fraying. The cover does not chafe or irritate the animal on which it is installed. It completely covers the tail and is water proof to help keep the tail dry, but includes openings and a breathable liner to vent moisture. It also protects the tail of an animal without interfering with blankets or other coverings that may be put on the animal. Furthermore, it aids in preventing the evaporation or removal of medications, treatments and cosmetics that may be applied to the tail.

It is an object of the present invention to cover the tail of an animal.

BRIEF DESCRIPTION OF THE DRAWINGS

FIG. 5 is a cross-sectional view of the tail cover of the present invention shown in FIG. 1, taken generally along the line 5—5 shown in FIG. 1; and FIG. 6 is a detail of the fastener portion of the tail cover of the present invention shown in FIG. 5.

DETAILED DESCRIPTION OF THE PREFERRED EMBODIMENT

Figure 1:
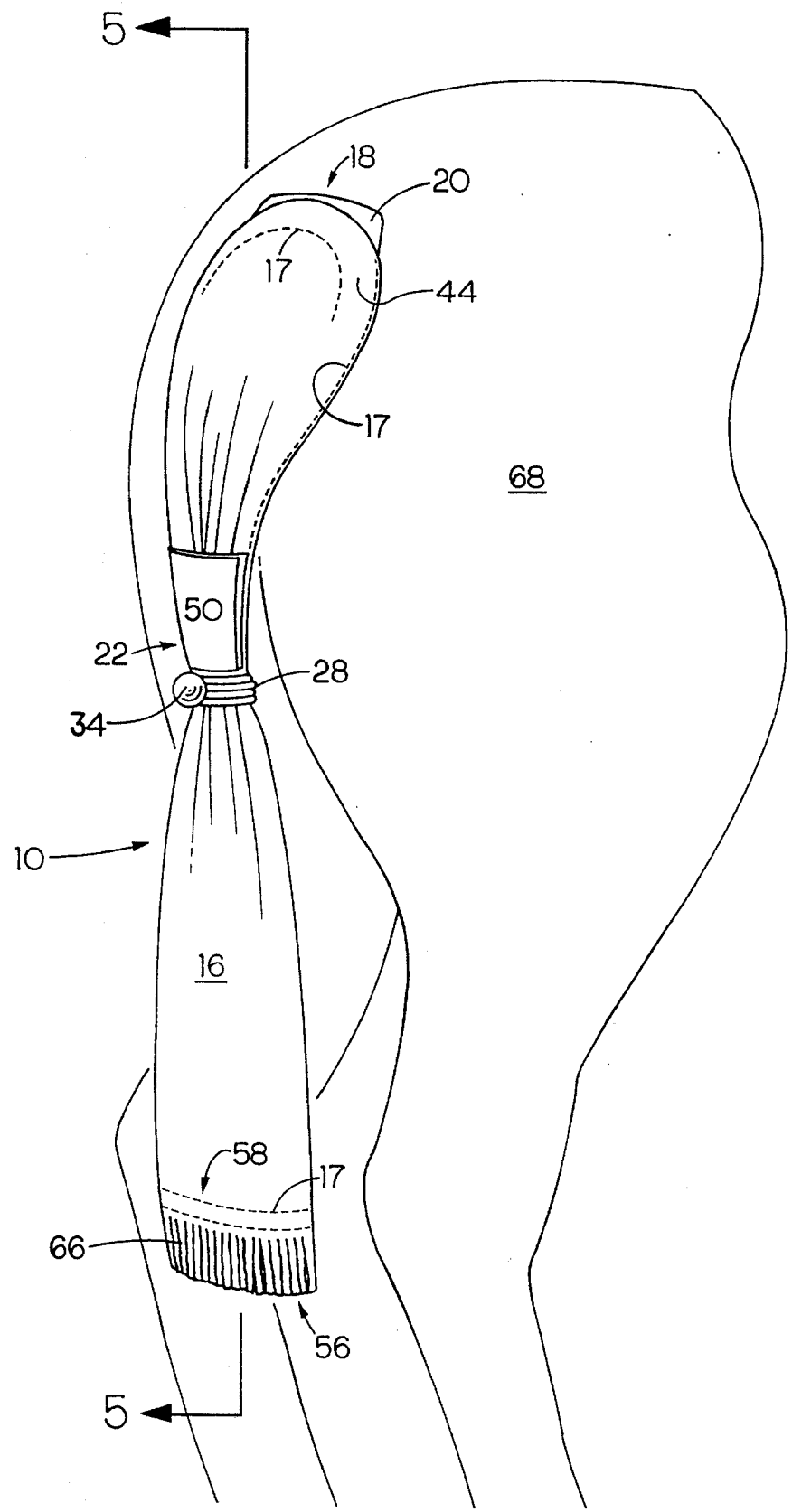
FIG. 1 is a perspective view of the tail cover of the present invention, shown attached to the tail of an animal.

Referring to the drawings, the cover of the present invention is indicated generally at 10. For reference, the front of cover 10 is shown as 12 in FIG. 5, and the rear of cover 10 is shown as 14. Cover 10 is elongate in shape, and is designed for enclosing the tail of an animal. Cover 10 includes an enclosure 16, preferably made of fabric, and more specifically made of coated rip-stop nylon. Stitching or sewing is shown generally at 17. Enclosure 16 has a top opening 18. Preferably, an extension 20 of elastic material extends from within enclosure 16 and out of opening 18. Extension 20 is preferably made of elastic material, such as spandex or lycra, and preferably nylon tricot. Extension 20 is preferably folded over at 21, so that there are no cut edges of elastic material to fray.

Figure 2:
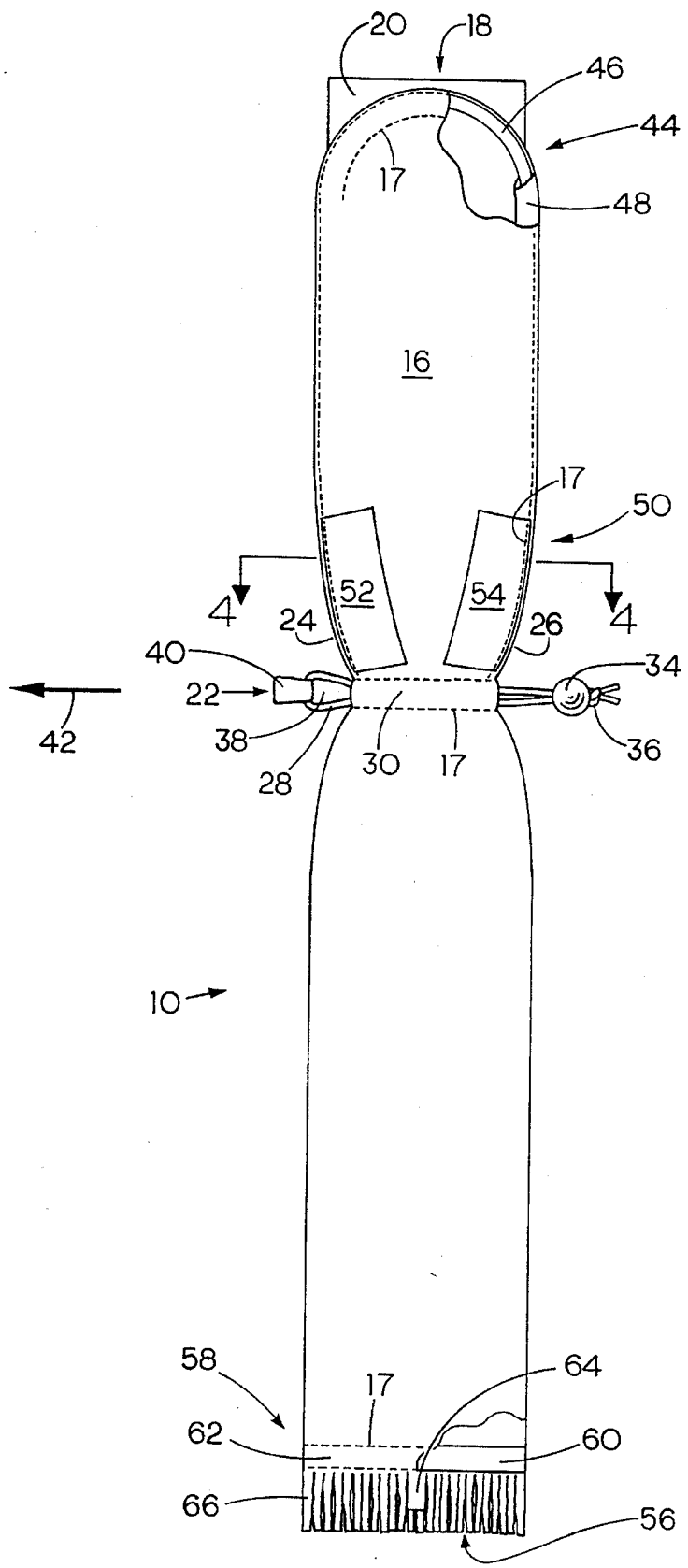
FIG. 2 is a front elevation of the tail cover shown in FIG. 1, with the tail cover being removed from the animal and portions of the tail cover being cut away to show the internal elements of the tail cover.

A fastener 22 is shown near the middle of enclosure 16, and is preferably manually releasable. For reference, a first side 24 of fastener 22 and a second side 26 of fastener 22 are indicated in FIG. 2. In the preferred embodiment, fastener 22 includes an elastic cord 28, preferably bungee or shock cord, that encircles enclosure 16 so that a tail passing through enclosure 16 can be captured by tightening cord 28. This tightening can be accomplished by simply tying cord 28. Preferably, a cord sleeve 30 is formed in enclosure 16 to contain cord 28, thus retaining cord 28 relative to cover 10. In the preferred embodiment, cord sleeve 30 is formed between enclosure 16 and a layer of a friction material 32, for example sheet foam or foam backed tricot, and more preferably rubber-coated knitted cotton, such as Tough Grip™, available from Seattle Fabric, 3876 Bridgeway N, Seattle, Wash., 98103. Other types of fastener 22 include, but are not limited to, clips and adhesives, not shown.

Figure 3:
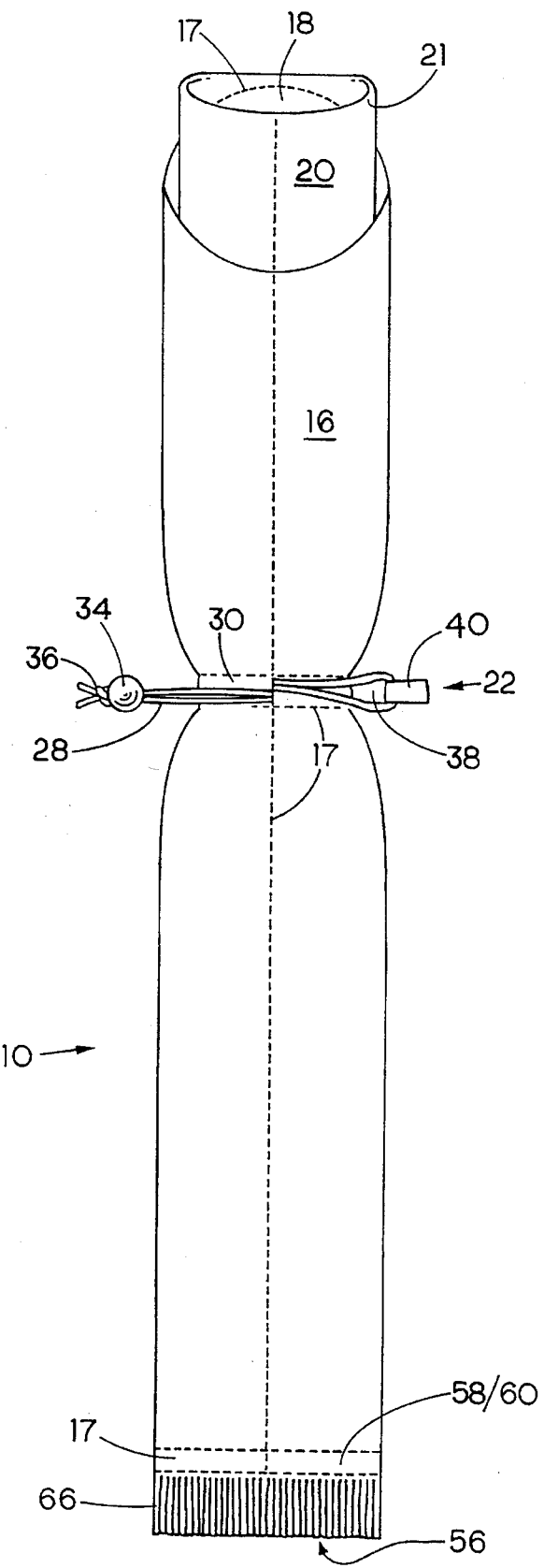
FIG. 3 is a rear elevation of the tail cover shown in FIG. 2.
Figure 4:
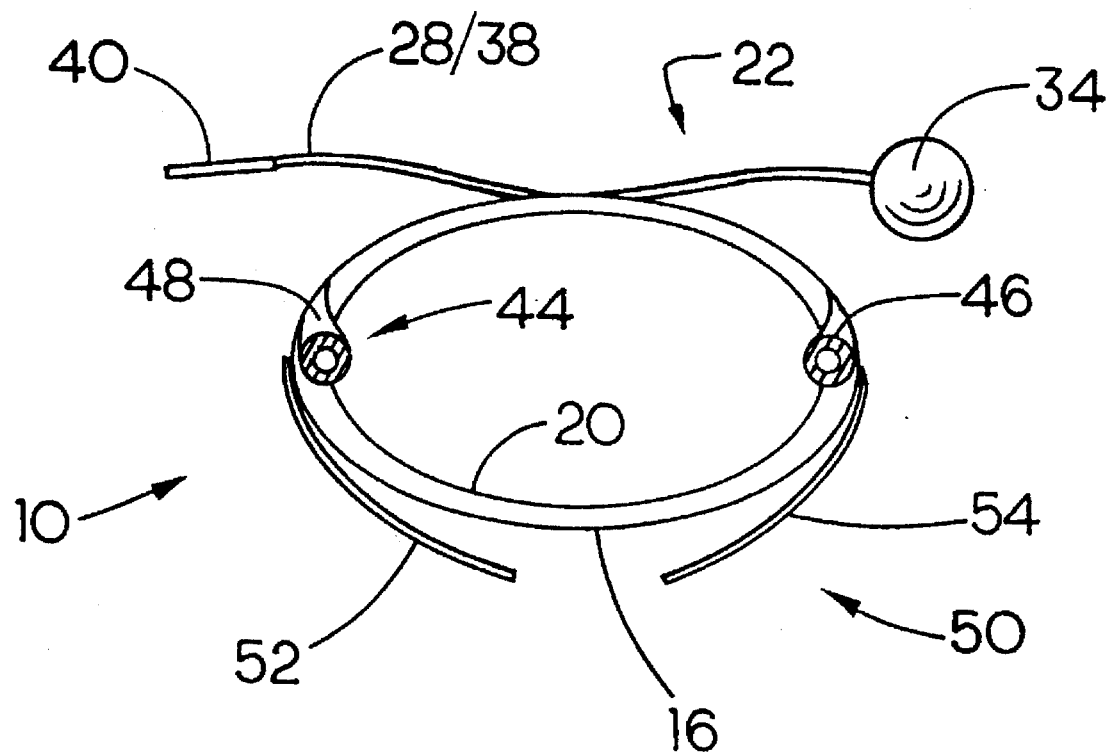
FIG. 4 is a cross-sectional view of the tail cover of the present invention shown in FIG. 2, taken along the line 4—4 shown in FIG. 2.

In the preferred embodiment, the tightening of cord 28 is facilitated by a bead 34, preferably a wooden or plastic bead that is held on cord 28 by a knot 36, and a loop 38 attached to which is a grip 40. To tighten cord 28, bead 34 is first pulled tightly against enclosure 16 by pulling cord. 28 through cord sleeve 30 in the direction indicated in FIG. 3 by arrow 42. Grip 40 is then used to wind loop 38 around enclosure 16, keeping cord 28 under tension. Loop 38 is then held in place by locking loop 38 over bead 34. In FIGS. 5 and 6, cord 28 is shown wound around enclosure 16, once inside cord sleeve 30, and thrice around the outside of enclosure 16. Alternatively, a releasable tightener (not shown) can be used to grip cord 28 through friction.

In the preferred embodiment, cover 10 includes a vertical support 44 that extends upwardly from fastener 22. Support 44 includes a stiffener 46, also referred to as a length of semi-flexible material 46, preferably plastic, or polyethylene, tubing. In the preferred embodiment, semi-flexible material 46 is encased in a support sleeve 48 formed in enclosure 16, and extends upwardly from one side of fastener 22, doubles back (or loops over) adjacent top opening 18, and extends downwardly to the other side of fastener 22, as shown in FIG. 2.

In the preferred embodiment, cover 10 further includes a support aligner 50 for selective orientation of support 44. Aligner 50 includes a first tab 52 attached to first side 24 adjacent one portion of support 44, and a second tab 54 attached to second side 26 adjacent another portion of support 44. When tab 52 is connected to tab 54, the two portions of support 44, which correspond to the two sides 24 and 26 of fastener 22, referred to above, can be oriented relative to each other, and relative to enclosure 16. Preferably, tab 52 is made of hook material and tab 54 is made of loop material so that the point of connection between tab 52 and tab 54 is selectively adjustable.

A bottom opening 56 is preferably included in enclosure 16 to facilitate the installation of cover 10. Bottom opening 56 includes a closure 58, preferably in the form of a first strip 60 that is connectable with a second strip 62. In the preferred embodiment, first strip 60 is made from hook material and second strip 62 is made from loop material so that strip 60 is selectively connectable with strip 62. Preferably, pull tabs 64 are attached adjacent bottom opening 56, with one pull tab 64 being attached directly to strip 60, and the other pull tab 64 being attached directly to strip 62. Thus, closure 58 can be opened by grasping each pull tab 64 and pulling the pull tabs 64 and their associated strips 60 and 62 apart. In the preferred embodiment, fringe 66 extends downwardly from bottom opening 56.

For reference, the body, and more specifically the rear end, of an animal is indicated generally at 68, including a tail 70. Tail 70 includes a dock 72, which is the portion of the tail including the tailbone and the flesh that overlies the tailbone. More specifically, dock 72 includes the tailbone which comprises a number of coccygeal vertebrae, and the flesh surrounding the tailbone. Thus, tail 70 can be viewed as having two portions. The first portion is the portion surrounding dock 72, beginning at the first coccygeal vertebra 74, being closest to the body 68 of the animal, and ending at the last coccygeal vertebra 76, being the tip of the tailbone. The second portion is the portion of the tail below dock 72, and is indicated generally at 78. Tail 70 includes hair 80.

From the foregoing, it will be appreciated that what has been described is a removable tail cover 10 for protecting the tail 70 of an animal 68. Tail cover 10 can be mounted on tail 70 by inserting tail 70 into top opening 18. This insertion can be facilitated by opening bottom opening 56, reaching through opening 56 and enclosure 16, and pulling tail 70 through enclosure 16. The upper portion of tail cover 10 is then adjusted by pulling extension 20 up around the base of dock 72, more specifically around the first coccygeal vertebra 74 or the base of tailbone. Extension 20 is slightly undersized relative to tail 70 so that extension 20 gently grips tail 70, thus holding the upper portion of tail cover 10 to tail 70.

Additional support for tail cover 10 is provided by fastening the middle of tail cover 10 to tail 70 at a point below dock 72, more specifically below the last coccygeal vertebra 74 or the tip of the tailbone, with fastener 22. Thus, if fastener 22 is of the type that includes a cord 28 that is tightened around tail 70 as shown in the drawings, cord 28 does not affect the flow of blood through dock 72 or through any part of the flesh surrounding the coccygeal vertebrae or tailbone. Friction material 32 is exposed on the interior of enclosure 16 so that it can engage at least a portion of hair 80. Friction material 32 increases the grip of fastener 22 to hair 80. It has been found that Tough Grip™ works particularly well as friction material 32 because it is not affected by the presence of oils or other substances on hair 80.

When extension 20 and fastener 22 have been properly placed on tail 70, support aligner 50 is used to selectively orient support 44. It has been found that adjusting support 44 to be adjacent the rear portion of tail 70 helps in keeping tail cover 10 on tail 70. Semi-flexible material 46 supports the upper portion of tail cover 10, while allowing some movement of the dock coccygeal vertebrae or tailbone portion of tail 70.

Extension 20 and vertical support 44, either separately or jointly, form a reinforcement structure for cover 10. This reinforcement structure helps to hold cover 10 on tail 70 by holding opening 18 above fastener 22. It is preferable that fastener 22 releases its hold on tail 70 below a threshold of grip that would rip or otherwise damage hair 80. It has been found that the combination of elastic cord 28 with friction material 32 provides the correct amount of grip.

Any portion of tail 70 that extends below bottom opening 56 can be folded upwardly and inserted back into enclosure 16. Closure 58 can then be closed to seal tail 70 inside enclosure 16. The bottom of enclosure 16 can be folded up and fastened under cord 28 to reduce the overall length of the covered tail, for preparation for foaling, trailering, breeding, or surgery.

Fringe 66 aids animal 68 by simulating an animal tail, thus improving the swatting action of the tail when it is enclosed in cover 10.

The invention also includes a method for practicing the invention. The method includes the steps of inserting at least a portion of tail 70 into enclosure 16, then attaching enclosure 16 to tail 70 at a point below dock 72 of tail 70 with fastener 22. The portion of enclosure 16 that is above fastener 22 is then supported by a reinforcement structure, including either extension 20 or support 44, or both extension 20 and support 44.

Industrial Applicability

The tail cover of the present invention is applicable in any situation in which it is desired to cover or protect the tail of an animal. It is particularly applicable to protecting the tails of show horses.

While a preferred embodiment and a practice method of the invented tail cover have been disclosed, changes and modifications can be made without departing from the spirit of the invention.

I claim:

1. A cover for use on the tail of an animal, the cover comprising:

an elongate cover for at least partially enclosing the tail, and having an opening for receiving the tail therethrough;

a fastener operatively connected to the elongate cover for gripping the tail at a point below the dock of the tail, thereby holding the elongate cover to the tail; and a reinforcement structure operatively connected to the elongate cover for holding the opening above the fastener, wherein the reinforcement structure includes a vertical support extending upwardly from the fastener for supporting the opening relative to the fastener.

2. The cover according to claim 1, wherein the reinforcement structure further includes an extension of elastic material for further supporting the opening by gripping the dock of the tail.

3. The cover according to claim 2, wherein the elastic material is nylon tricot.

4. The cover according to claim 1, wherein the fastener includes a cord for encircling the tail.

5. The cover according to claim 1, further comprising friction material for gripping the hair of the tail.

6. The cover according to claim 1, wherein the reinforcement structure includes an aligner operatively connected to the vertical support for selectively orienting the support relative to the tail.

7. The cover according to claim 1, wherein the support is made of plastic tubing.

8. The cover according to claim 1, wherein the reinforcement structure further includes tabs of hook and loop material operatively connected to the vertical support for selectively orienting the support relative to the tail.

9. The cover according to claim 8, wherein the fastener further includes a cord for encircling the tail.

10. A cover for use on the tail of an animal, the cover comprising:

an elongate cover for at least partially enclosing the tail, and having an opening for receiving the tail therethrough;

a fastener operatively connected to the elongate cover for gripping the tail at a point below the dock of the tail, thereby holding the elongate cover to the tail; and a reinforcement structure operatively connected to the elongate cover for holding the opening above the fastener, wherein the reinforcement structure includes an extension of elastic material for supporting the opening by gripping the dock of the tail.

11. A method of protecting the tail of an animal, the method comprising the steps of:

inserting at least a portion of the tail into an elongate cover with an opening through which the tail extends;

attaching the elongate cover to the tail at a point below the dock of the tail with a fastener operatively connected to the elongate cover; and supporting the opening of the elongate cover at a point above the fastener with a vertical support operatively connected to the cover and extending upwardly from the fastener.

12. The method of claim 11, wherein the supporting step is additionally accomplished by providing an extension of elastic material attached to the cover so that the elastic material grips the dock of the tail.

13. A tail cover for use on an animal, the tail cover comprising:

an enclosure having an opening for receiving the dock of the tail therethrough, thereby enclosing substantially all of the tail below the dock of the tail;

a releasable fastener for releasably holding the enclosure to the hair of the tail by gripping the tail; and a vertical support extending upwardly from the fastener for supporting the opening of the enclosure relative to the fastener.

14. The tail cover according to claim 13, wherein the fastener is located for gripping the tail below the dock of the tail.

15. The tail cover according to claim 13, further comprising a layer of friction material for engaging at least a portion of the hair of the tail.

16. The tail cover according to claim 15, further comprising a cord for holding the friction material against the hair.

17. The tail cover according to claim 13, further including an extension of elastic material attached to the opening and undersized relative to the tail for gripping the tail.

18. The tail according to claim 17, wherein the elastic material is nylon tricot.

19. The tail cover according to claim 13, wherein the vertical support includes a stiffener extending between the fastener and the opening.

20. The tail cover according to claim 19, wherein the stiffener includes a length of plastic tubing.

21. A method of protecting the tail of an animal, the method comprising the steps of:

inserting at least a portion of the tail into an elongate cover with an opening through which the tail extends;

attaching the elongate cover to the tail at a point below the dock of the tail with a fastener operatively connected to the elongate cover; and supporting the opening of the elongate cover at a point above the fastener with an extension of elastic material attached to the elongate cover so that the elastic material grips the dock of the tail.

* * * * *